US006052876A

United States Patent [19]

Hogan et al.

[11] Patent Number: 6,052,876

[45] Date of Patent: Apr. 25, 2000

[54] VERSATILE ATTACHMENT MECHANISM FOR THEFT DETERRENT TAGS

[75] Inventors: Dennis L. Hogan, Lighthouse Point; Edward J. DiCarlo, Boynton Beach, both of Fla.

[73] Assignee: Sensormatic Electronics Corporation, Boca Raton, Fla.

[21] Appl. No.: 09/203,979

[22] Filed: Dec. 2, 1998

[51] Int. Cl.[7] .......... F16B 19/00

[52] U.S. Cl. .......... 24/704.1; 411/439; 70/57.1

[58] Field of Search .......... 24/356, 453, 704.1, 24/704.2; 70/57.1; 292/307 R, 320; 411/351, 400, 401, 409, 439, 498; D8/391, 348

[56] References Cited

U.S. PATENT DOCUMENTS

| | | | |
|---|---|---|---|
| 524,660 | 8/1894 | Woodward | 411/498 |
| 3,121,365 | 2/1964 | Hayashi | 411/439 |
| 4,419,029 | 12/1983 | Wenzel | 411/409 X |
| 4,658,481 | 4/1987 | Seyler et al. | 24/704.1 |
| 5,426,419 | 6/1995 | Nguyen et al. | 340/572 |
| 5,528,914 | 6/1996 | Nguyen et al. | 70/57.1 |
| 5,535,606 | 7/1996 | Nguyen et al. | 70/57.1 |

FOREIGN PATENT DOCUMENTS

| | | | |
|---|---|---|---|
| 12813 | 6/1893 | United Kingdom | 411/439 |

*Primary Examiner*—James R. Brittain
*Assistant Examiner*—Robert J. Sandy
*Attorney, Agent, or Firm*—Rick F. Comoglio

[57] ABSTRACT

An improved attachment mechanism for a reusable theft deterrent tag of the type that includes a tack assembly as part of the attachment mechanism. The provided attachment mechanism includes a tack assembly having an elongated tack body connected to a tack head. A retaining member is attachable to the tack head and forms a loop to provide a variety of additional attachment positions for attachment to various articles to be protected and/or identified. The tack head includes at least one recessed area under the tack head on the side adjacent the tack body to receive at least one end of the retaining member. When the tack body is inserted into a theft deterrent tag, the tack head rests relatively flush against the tag body, capturing the retaining member end in the recessed area. The end of the retaining member includes a shoulder that engages a mating blocking member in the recessed area to prevent the end of the retaining member from being pried out of the tack head when the tack assembly is properly connected to a tag. A wire lanyard can be utilized with, or in place of the retaining member for attachment to certain articles. The retaining member can be made of a rigid or semi-flexible hardened material that is difficult to cut and/or break.

16 Claims, 7 Drawing Sheets

VERSATILE ATTACHMENT MECHANISM FOR THEFT DETERRENT TAGS

CROSS REFERENCES TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates to security tags used in theft prevention, and more particularly to mechanisms for attachment of security tags to items to be protected or identified.

2. Description of the Related Art

Theft deterrence is presently accomplished in several ways. Items to be protected can simply be locked up. However, in sales environments, placing merchandise under lock and key virtually eliminates impulse purchasing and generally reduces sales volume. Benefit denial is another technique utilized in which the benefit of the use of stolen articles is removed to eliminate the motivation for taking the articles. Benefit denial includes the use of ink tags that are attached to the articles to be protected. When an attempt is made to remove the ink tags from protected goods, the ink tags rupture spilling the contents, which is typically permanent ink, over the article and the thief. Another technique to deter theft is to attach tags that are detectable by electronic article surveillance systems to articles to be protected.

Electronic article surveillance (EAS) systems are well known in the art and are used for inventory control, identification, and to prevent theft and other unauthorized removal of articles from a preselected area. Typically, such systems include at least one transmitter and at least one receiver that provide one or more surveillance zones that articles must traverse to be removed from the preselected area.

An EAS security tag is affixed to each article to be protected. The EAS tag includes a marker or sensor adapted to interact with a signal transmitted by the system transmitter in the surveillance zone. The interaction of the marker or sensor causes a further signal to be established in the surveillance zone that is detected by the system receiver. Accordingly, upon movement of a tagged article through the surveillance zone, a signal will be generated and received by the system receiver identifying the presence of the tagged article in the zone.

Certain types of EAS tags have been designed to be reusable, and thus include releasable attachment devices for affixing the tags to the articles to be protected. The attachment devices are designed to be releasable only by authorized personnel, and typically require the use of an associated special tool or detaching mechanism.

A reusable EAS tag that is particularly reliable and is in wide usage for theft deterrence is illustrated in U.S. Pat. No. 5,426,419, to Nguyen et al., the disclosure of which is incorporated herein by reference.

Referring to FIGS. 1 and 2, one embodiment of an EAS tag 1 includes a tag body 2 and an attachment mechanism comprising a tack assembly 4 having a tack head 40 and an elongated tack body 41. EAS tag 1 and tack assembly 4 are fully disclosed in, and illustrated in FIGS. 1 and 6A of, the '419 patent. For convenience, relevant portions of FIGS. 1 and 6A are reproduced herein as FIGS. 1 and 2, respectively.

The tack body 41 is receivable within a first opening in the tag body 2. A receiving and clutching means within the tag body 2 receives and clutches one of the slots or grooves 42 in tack body 41, preventing withdrawal of the tack body 41 from the tag body 2. A second opening 9 in the tag body 2 includes an arcuate channel that permits an arcuate probe to be guided into a means for releasing the clutching means, thereby allowing withdrawal of the tack body 41 and separation of the tack assembly 4 from the tag 1.

To affix the tag 1 to an article 51 to be protected, the tack body 41 can be pushed through a portion of the article 51 and inserted into the first opening in the tag body 2, where it is clutched by the clutching means. The tack body 41 includes a pointed end 43 that facilitates pushing tack body 41 through various articles 51. For some applications, it is desired that the tack body 41 should not, or cannot be passed through a portion of the article.

For example, when an EAS tag is attached to a shoe, the tack body 41 can be passed through one of the shoe's lace eyelets to secure the tag 1 to the shoe. This practice is fine for some shoe types. However, the tag/tack head often covers the eyelet interfering with the lacing process and/or may put an undesired indentation into the shoe leather.

In addition, articles such as briefcases, luggage, power and hand tools, sporting goods, and many other hard and soft goods cannot be properly tagged because the tack body cannot be passed through a portion of the article.

Referring to FIG. 3, for those applications where the tack body is not passed through a portion of the article, a wire lanyard 3 having a loop 6 at each end can be wrapped around, or passed through a suitable opening in the article to be protected. The wire lanyard 3 can be secured to the tag by passing the tack body 41 through one or both of the end loops 6, and inserting the tack body 41 into the first opening in the tag body 2. However, the wire end loops 6 disposed around the tack body 41 prevents the tack head 40 from resting relatively flush against the tag body 2 leaving space 7. The space 7 caused by the wire between the tack head 40 and the tag body 2 may permit an unauthorized person to apply leverage against the tack head 40 and possibly pry out the tack body 41 from the clutching means, thereby removing the tag from the article.

In applications using EAS and other tags of the type that include a tack assembly comprising a tack head and tack body as part of the attachment mechanism in which the tack head is prevented from resting properly adjacent the tag body, an improved tack attachment mechanism is needed.

BRIEF SUMMARY OF THE INVENTION

In accordance with the present invention there is provided an improved tack assembly for a theft deterrent tag of the type that includes a tack assembly as part of the attachment mechanism, one embodiment of which is disclosed in the '419 patent as described hereinabove. However, many other tags are known that utilize a tack assembly for attachment of the tag to articles to be protected and/or identified, and the present invention is not to be limited in application solely to the tag disclosed in the '419 patent.

The new tack assembly of the present invention utilizes a known elongated tack body with a new tack head that receives a retaining member. The retaining member can be C-shaped, U-shaped, triangular, or any shape that is capable of forming a substantially closed loop. The retaining member referred to herein will be construed to cover all of the various shapes and materials that can be made to form a closed loop.

The ends of the retaining member are secured under and in the tack head. The ends of the retaining member are captured in place in the tack head when the tack body is inserted into a first opening in the tag body and secured by the clutching mechanism. When the tack body is clutched, the tack head is positioned in close proximity to the tag body such that the retaining member cannot be removed from underneath the tack head. In one embodiment, the tack head is positioned substantially flush with the tag body.

The tack head includes a suitable recessed area, or areas, under the tack head, or on the side of the tack head adjacent the elongated tack body, to receive the retaining member. The recessed area, or areas, in the tack head is/are sized and shaped to receive at least one end of the retaining member. The end(s) of the retaining member include(s) a shoulder that is retained by a mating shoulder or blocking member within the recessed area(s) in the tack head to prevent the end(s) of the retaining member from being pried or pulled out of the tack head when the tack assembly is in place within the tag body. In one embodiment the end(s) of the retaining member are spherical or ball shaped.

The retaining member can be rigid and can be made of hardened steel, wire, or similar material, and is preferably made of hardened steel rod. The retaining member can be passed through a suitable opening in a portion of the article to be protected, or wrapped around a portion of the article, and inserted into and secured by the tack head when the tack body is inserted into the tag body. As described in the ’419 patent, the tack head is held firmly adjacent the tag body by the clutching mechanism within the tag body clutching one of the grooves in the tack body. Any known clutching mechanism can be utilized within the tag body to clutch the tack body of the tack assembly of the present invention provided the tack head is retained in a manner that prevents the removal of the retaining member from within the tack head.

A wire lanyard of any suitable length can also be used in certain applications to aid in attachment of the tag to an article to be protected. The lanyard can have a loop at each end with each loop secured by the retaining member to form a larger wire loop. The wire lanyard can be passed around a portion of the article, or through a suitable opening in the article, and then secured through the end loops by the retaining member. The ends of the retaining member are captured securely by the tack head when installed in the tag body.

The retaining member is free to rotate about 180 degrees in relation to the tack head. The tack body along with the attached tack head preferably rotates within the clutching mechanism 360 degrees relative to the tag body. Therefore, the retaining member can rotate 360 degrees relative to the tag body and 180 degrees relative to the tack head, providing a variety of possible attachment angles, and increasing the difficulty for an unauthorized person defeating the tag attachment mechanism by prying or tampering.

Alternately, as fully described hereinbelow, a wire lanyard can be used as the retaining member and will include a ball or other shaped structure on one or both ends of the wire that is/are captured by one or more associated recessed area(s) under and within the tack head. The ball or other structure forms the shoulder which prevents the wire from being pried or pulled from the tack head.

The present invention provides a theft deterrent tag attachment assembly that enables tags to be easily and properly attached to a large variety of articles to be protected. Utilizing the present invention allows proper and secure tag attachment to items such as shoes, brief cases, luggage, purses, power and hand tools, sporting goods, and many other hard and soft goods.

In addition, the present invention can be utilized to provide a locking mechanism for articles of merchandise. For example, the lanyard can be made sufficiently long to engage one or more articles of merchandise and then be passed around or through a portion of a fixed structure and secured to the tag body to lock the items to that structure.

Accordingly, it is an object of the present invention to provide an improved attachment mechanism for a theft deterrent tag of the type that includes a tack assembly having a tack head and an elongated tack body, and a removably attachable retaining member.

It is another object of the present invention to provide an improved tack attachment mechanism for a theft deterrent tag that includes a retaining member that is captured by the tack head when secured closely adjacent the tag body.

It is a further object of the present invention to provide an improved tack attachment mechanism for a theft deterrent tag that includes a retaining member that is captured by the tack head when secured substantially flush against the tag body.

It is still a further object of the present invention to provide an improved tack attachment mechanism for a theft deterrent tag that permits use of a wire lanyard of suitable length without preventing the tack head from resting properly adjacent the tag body.

Other objectives, advantages, and applications of the present invention will be made apparent by the following detailed description of the preferred embodiment of the invention.

DETAILED DESCRIPTION OF THE INVENTION

Figure 1:
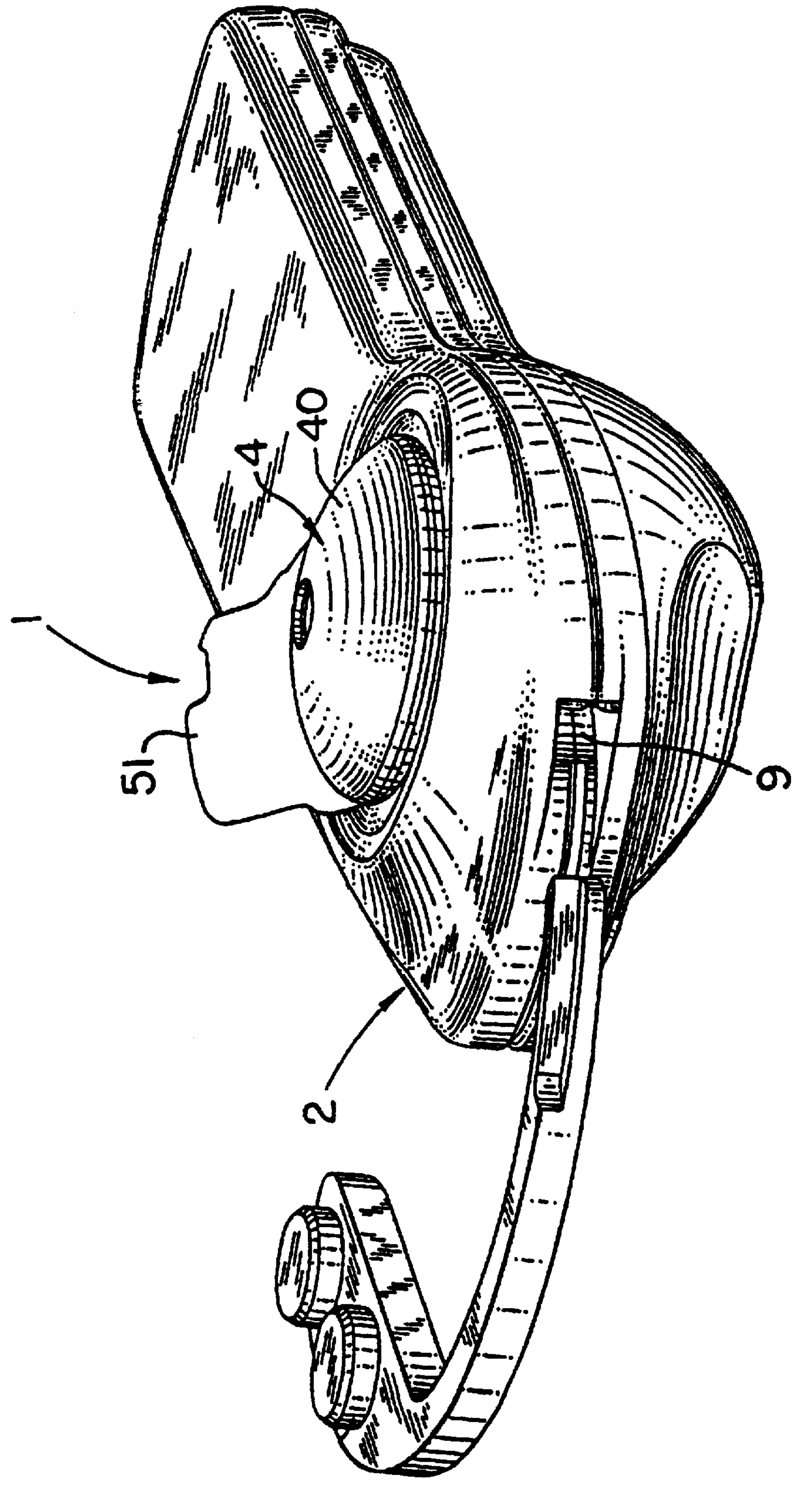
FIG. 1 Prior Art
FIG. 1 is a perspective view of a prior art EAS tag and tack attachment assembly.
Figure 3:
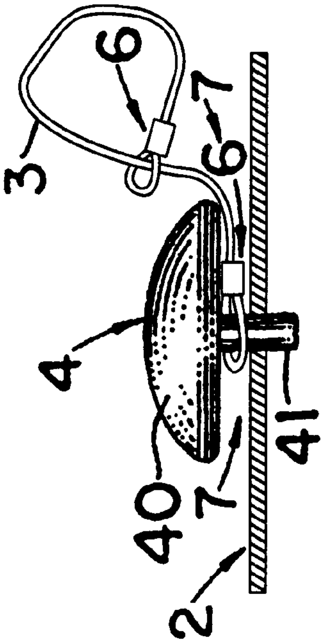
FIG. 3 Prior Art
FIG. 3 is a partial side elevational view of a wire lanyard used with a prior art tack assembly and theft deterrent tag.
Figure 2:
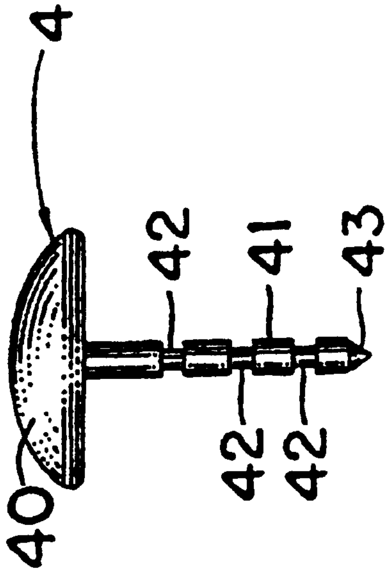
FIG. 2 Prior Art
FIG. 2 is a side elevational view of a prior art tack assembly.
Figure 4:
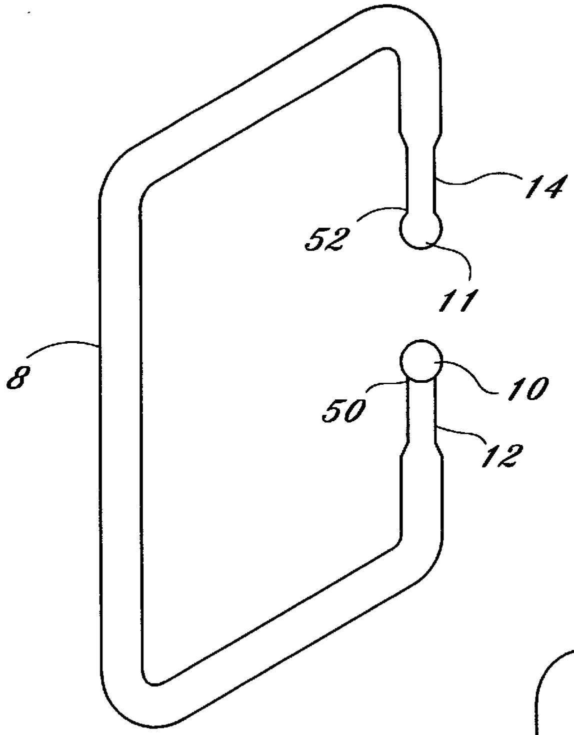
FIG. 4 is a perspective view of one embodiment of the retaining member of the present invention.
Figure 5:
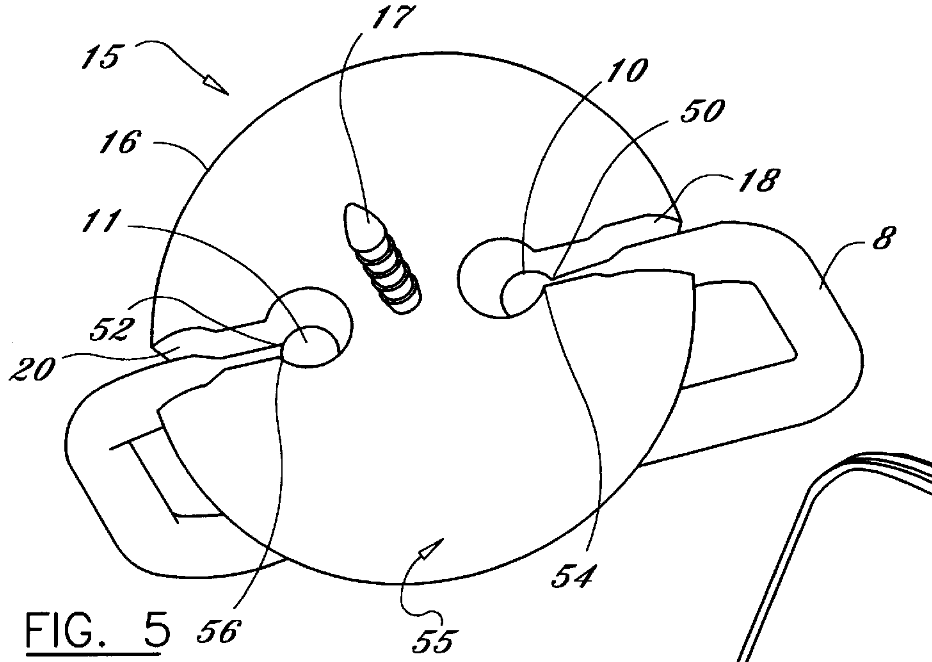
FIG. 5 is a bottom perspective view of the one embodiment of the tack assembly of the present invention.
Figure 6:
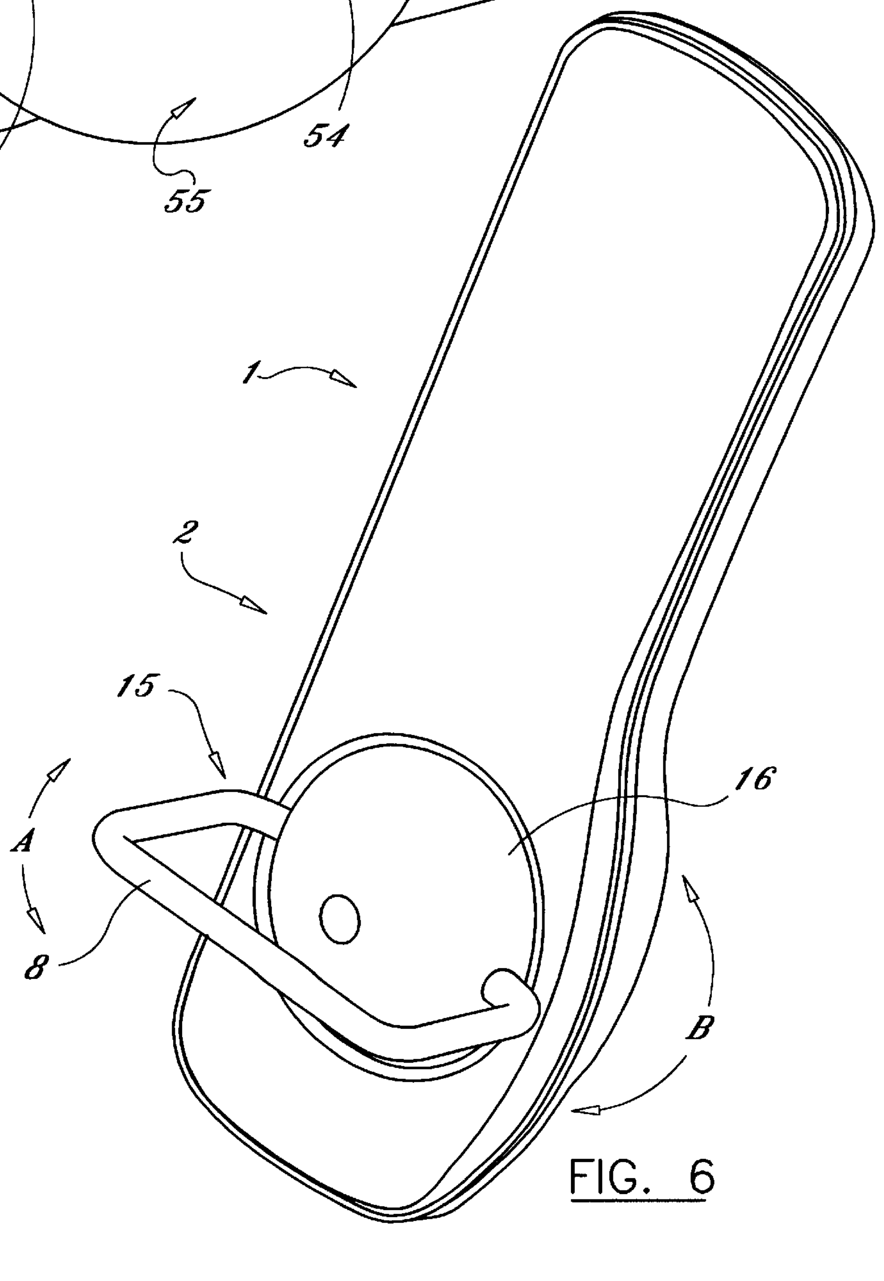
FIG. 6 is a top perspective view of one embodiment of the present invention in use with an EAS tag.

Referring to FIGS. 4, 5, and 6, one embodiment of the present invention is illustrated including tack assembly 15 and retaining member 8. Tack assembly 15 includes tack head 16 and elongated tack body 17. Retaining member 8 includes end members 10 and 11. Retaining member 8 can be any shaped retaining member, such as C-shaped, U-shaped, or triangular, or any shape that is capable of forming a substantially closed loop. Tack head 16 includes recessed areas 18 and 20 sized to receive ends 10 and 11, respectively, of retaining member 8. Recessed areas 18 and 20 are disposed on the underside 55 of tack head 16, which is adjacent elongated tack body 17. End members 10 and 11 are placed within recessed areas 18 and 20, respectively, from underside 55 of tack head 16, prior to elongated tack body 17 being inserted into a first opening (not shown) in tag body 2. When elongated tack body 17 is inserted into tag body 2, the recessed position of retaining member 8 in tack head 16 permits the underside 55 of tack head 16 to rest in close proximity to tag body 2. Tack head 16 is retained in close enough proximity to tag body 2 such that the ends 10 and 11 of retaining member 8 cannot be removed from recessed areas 18 and 20 from underside 55 of tack head 16.

In the preferred embodiment, tack head 16 is retained substantially flush against tag body 2. It is not critical that tack head 16 rest substantially flush against tag body 2. However, it is critical that retaining member 8 must not be removable from underside 55 of tack head 16 when tack assembly 15 is retained in tag body 2. In addition, there should be insufficient space between tack head 16 and tag body 2 for a prying tool to be used to apply leverage to tack head 16 in an attempt to remove tack assembly 15 from tag 1. Furthermore, it is important that ends 10 and 11 of retaining member 8 cannot be pried laterally outward, in a direction substantially perpendicular to elongated tack body 17, from recessed areas 18 and 20 in tack head 16 when tack assembly 15 is in place in tag 1. If either end 10 or end 11 can be pulled laterally out of recessed area 18 or 20, respectively, then tag 1 could be removed from an article that is intended to be protected. Therefore, there must be a mechanism to prevent ends 10 and 11 from being removed laterally outward from recessed areas 18 and 20 when the tack assembly 15 is in place in tag 1.

In one embodiment, end members 10 and 11 of retaining member 8 are shaped to form shoulders that can mate against corresponding shoulders or other blocking members within the recessed areas 18 and 20 in tack head 16. In the preferred embodiment, end members 10 and 11 are substantially spherical in shape forming shoulders 50 and 52, respectively. Recessed areas 18 and 20 can include shoulders or blocking members 54 and 56, which are sized to engage shoulders 50 and 52, respectively, and prevent lateral removal of ends 10 and 11, respectively, as best illustrated in FIG. 5. Alternately, shoulders 54 and 56 can be any blocking mechanism within recessed areas 18 and 20 that prevent lateral removal of ends 10 and 11.

As illustrated in FIG. 4, in one embodiment, the diameter of retaining member 8 can be made uniform throughout from end 10 to end 11 with the exception of recessed sections 12 and 14. Recessed sections 12 and 14 are used to form shoulders 50 and 52. As stated, shoulders 50 and 52 are used to prevent unauthorized lateral removal of retaining member 8 from tack head 16 when in place in tag body 2. Alternately, instead of recessed areas 12 and 14, the spherical ends 10 and 11 can be made larger in diameter, which would form shoulders (not shown but analogous to shoulders 50 and 52) that would be utilized in a similar manner as shoulders 50 and 52. In addition, ends 10 and 11 of retaining member 8 can have shapes other than spherical, which form shoulders that engage corresponding blocking members within recessed areas 18 and 20 preventing retaining member 8 from lateral removal from tack head 16 when assembled together with tag 1.

Therefore, unauthorized personnel cannot remove retaining member 8 once tack assembly 15 is properly retained in place in tag 1. Because of the clutching mechanism within tag 1, tack body 17 cannot be pulled free from tag body 2 without the proper release tool. Blocking members 54 and 56 within tack head 16 are sized to engage shoulders 50 and 52, respectively, should an attempt be made to pry the end members 10 and 11 of retaining member 8 laterally outward from the recessed areas 18 and 20 within tack head 16.

Any known clutching mechanism can be utilized within tag 1 for retaining tack body 17 provided that the tack head 16 is positioned in close enough proximity to the tag body 2 such that ends 10 and 11 of retaining member 8 cannot be removed from recessed areas 18 and 20 from underside 55 of tack head 16. A plurality of clutching mechanisms are known in the art, many of which can be adapted for use with the present invention. As described herein above, an example of a specific clutching mechanism usable with the present invention is fully described in the '419 patent which has been incorporated herein by reference.

Referring to FIG. 6, retaining member 8 preferably can rotate approximately 180 degrees relative to tack head 16, with an axis of rotation perpendicular to tack body 17, as shown by reference numeral A. Tack body 17 along with attached tack head 16 preferably rotates within the clutching mechanism 360 degrees relative to the tag body 2, with an axis of rotation collinear with tack body 17. Therefore, retaining member 8 and can rotate 360 degrees relative to tag 1, as shown by reference numeral B. The rotation of retaining member 8, 360 degrees relative to tag body 2 and 180 degrees relative to tack head 16, permits a plurality of attachment positions for tag 1, and provides further protection against unauthorized removal by reducing possible positions for applying leverage against tack head 16.

Figure 7:
FIG. 7 is a perspective view of the embodiment of the present invention illustrated in FIGS. 4–6 attached to an article.

Referring to FIG. 7, in operation, retaining member 8 can be passed through a suitable opening in an article to be protected and/or identified. In the example illustrated in FIG. 7, retaining member 8 is passed through a portion of shoe 21. End members 10 and 11 of retaining member 8 are then placed into recessed areas 18 and 20, respectively, of tack head 16. Tack body 17 is next inserted into a first opening (not shown) in tag body 2, and tack assembly 15 and tag 1 are pressed together until underside 55 of tack head 16 is properly seated relatively flush against tag body 2.

Figure 8:
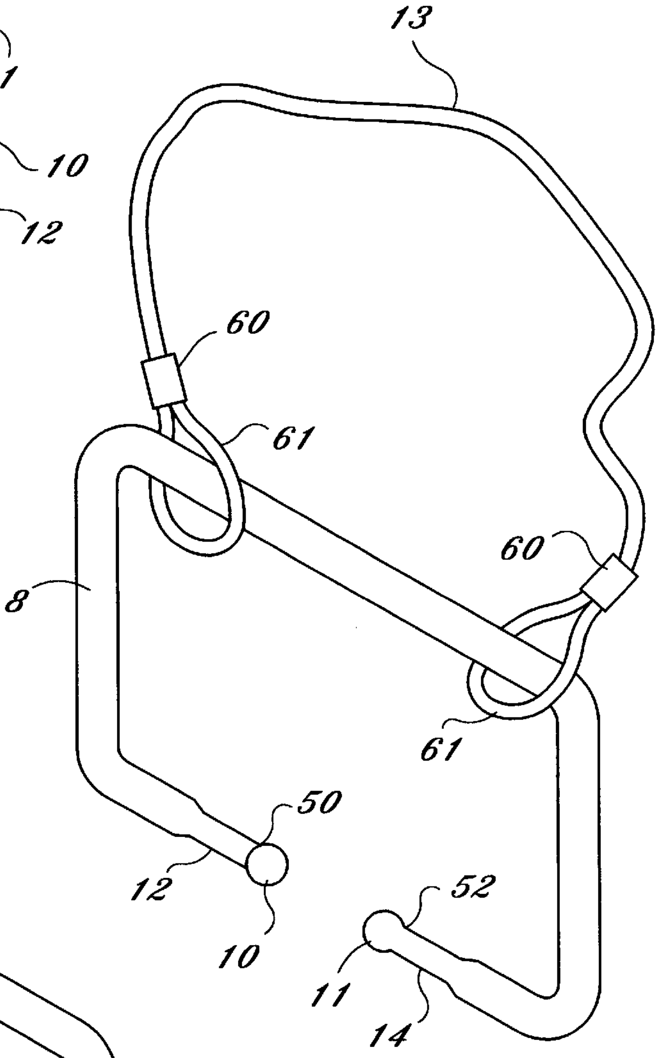
FIG. 8 is a perspective view of a lanyard in use with the embodiment of the present invention illustrated in FIGS. 4–6.

In a similar manner, retaining member 8 can be either inserted through a suitable opening in, or placed around a suitable portion of, a variety of different articles to be protected and/or identified. However, certain articles may not be suitable for tag attachment in this manner, and may require the use of a lanyard 13, as illustrated in FIG. 8. Lanyard 13 is preferably made of hardened wire, but can be made of any suitable semi-flexible material that is difficult to cut and/or break. Loops 61 are formed at each end and can be made by attachment collars 60, which can be compressible, solderable, or bondable, as known in the art. Lanyard 13 can be made nearly any diameter and/or length suitable for the particular application intended.

Figure 9:
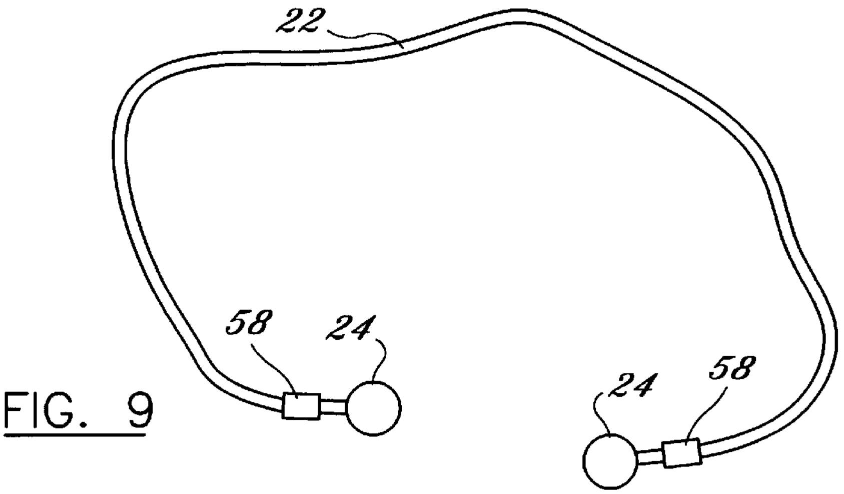
FIG. 9 is a perspective view of an alternate embodiment of the retaining member of the present invention.

Referring to FIG. 9, for certain applications, lanyard 22 can be constructed having spherical end members 24, which are then placed into recessed areas 18 and 20 in tack head 16 in analogous manner to end members 10 and 11 of retaining member 8. End members 24 are attached to lanyard 22 by attachment collars 58, which are similar to collars 60. Lanyard 22 can be made nearly any length and diameter. As with end members 10 and 11, spherical end members 24 can be made a shape other than spherical provided that a mechanism is provided to prevent the lateral removal of end members 24 from recessed areas 18 and 20 in tack head 16 when tack assembly 15 is in place in tag 1.

Figure 10:
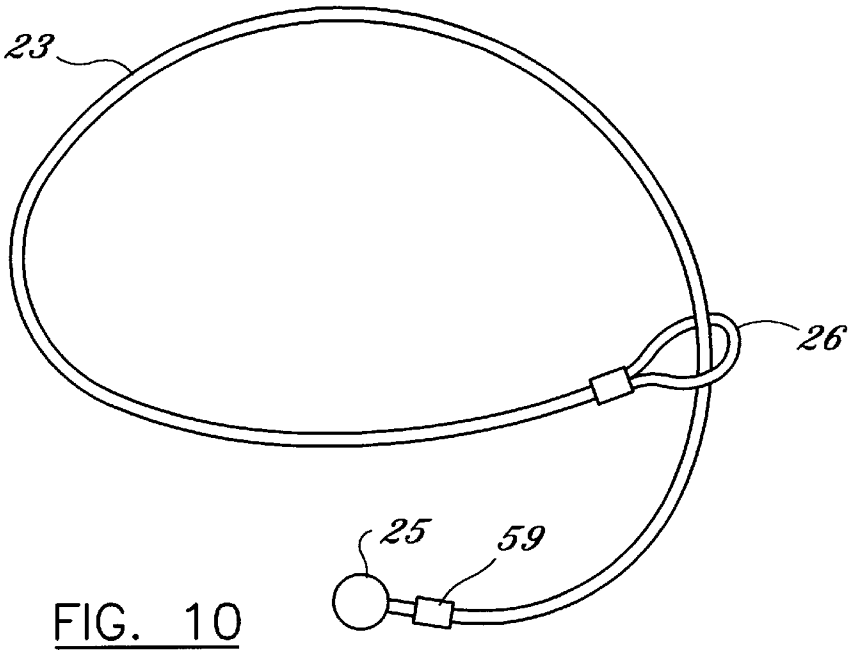
FIG. 10 is a perspective view of an alternate embodiment of the retaining member of the present invention.

Referring to FIG. 10, in an alternate embodiment, one end of lanyard 23 can have loop 26 attached instead of a second sphere 25. Spherical end member 25 is attached at collar 59, and is identical to end member 24 and collar 58. As with end members 24, the specific shape of end member 25 can be other than spherical.

Loop 26 is sized just large enough to permit passage of sphere 25, but small enough to prevent passage of tag 1 through loop 26. By passing sphere 25 through loop 26 and into one of the recessed areas 18 or 20 in tack head 16, a large loop in lanyard 23 can be formed to wrap around suitable articles to be protected.

Figure 11:
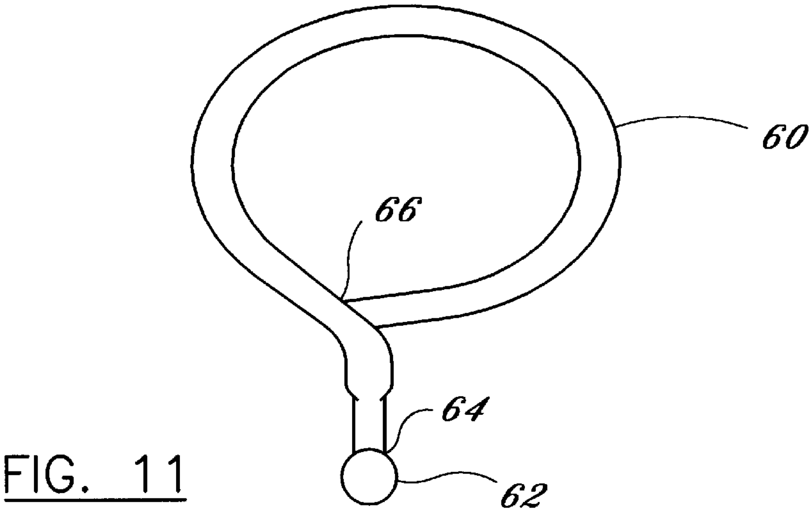
FIG. 11 is a perspective view of an alternate embodiment of the retaining member of the present invention.

Referring to FIG. 11, an alternate embodiment of the retaining member is illustrated as rigid loop 60 having a single end member 62 with shoulder 64. End member 62 can be placed into recessed area 18 or 20 in tack head 16 and functions similarly to end members 10 and 11 described above. Loop 60 can be welded, soldered, or bonded at 66 if desired. As with the end members described in the other embodiments of retaining members, end member 62 can be other than spherical.

Figure 12:
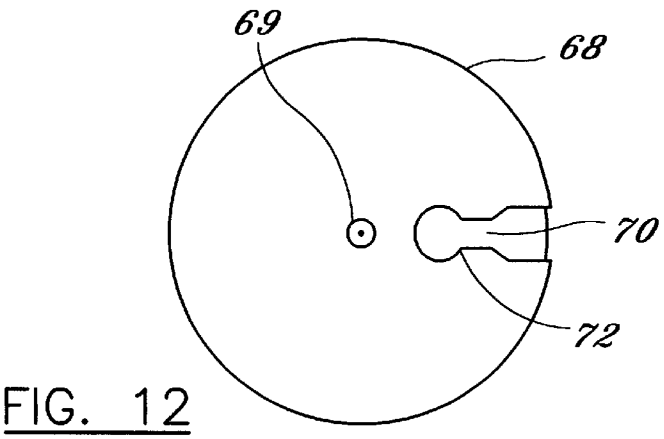
FIG. 12 is a bottom plan view of an alternate embodiment of the tack assembly of the present invention.

Referring to FIG. 12, for the embodiments of retaining members having a single end member, such as lanyard 23, rigid loop 60, and others contemplated by the present invention, a modified tack head 68 can be made with only one recessed area 70 to receive end members 24 or 62, respectively, or others not shown but contemplated herein. Elongated tack body 69 is identical to tack body 17. Recessed area 70 can include a shoulder 72 or other blocking member to prevent the lateral removal of the inserted end member of the associated retaining member.

The specific blocking member disposed within the recessed area or recessed areas within the tack head will be determined by the structure of the end member or end members of the associated retaining member. The spherical shape of the end members, and corresponding shaped recessed areas used herein as examples are believed to be the best mode for practicing the invention. However, other blocking mechanisms are contemplated for preventing the lateral removal of the end members of the retaining member from the tack head.

Figure 13:
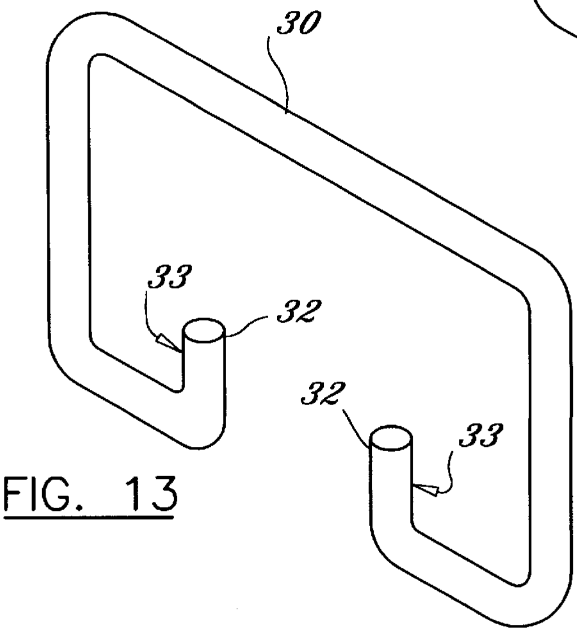
FIG. 13 is a perspective view of an alternate embodiment of the retaining member of the present invention.
Figure 14:
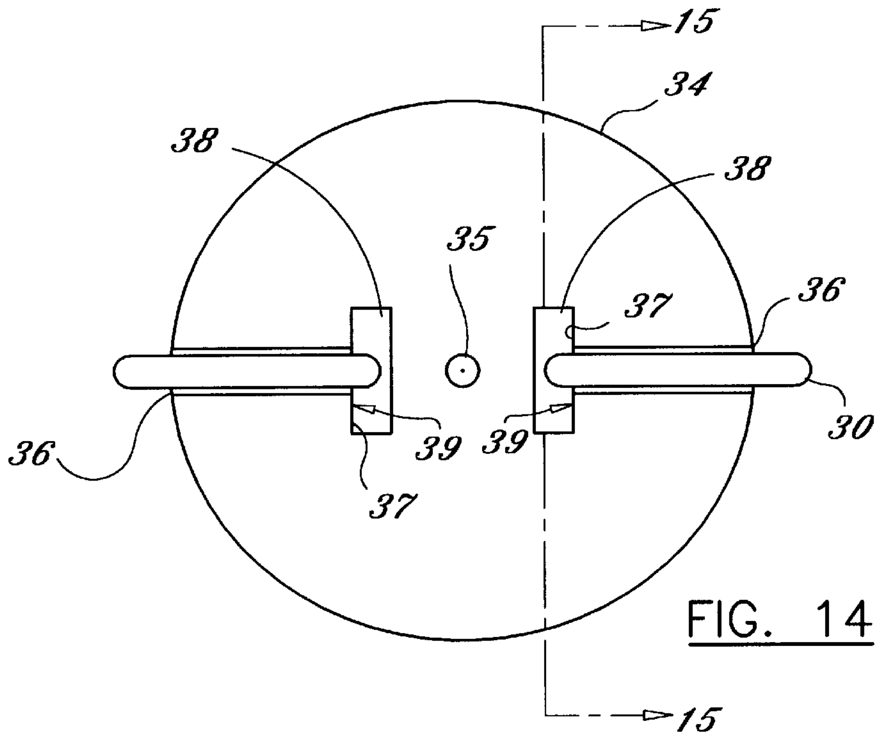
FIG. 14 is a bottom plan view of an alternate embodiment of the tack assembly of the present invention.
Figure 15:
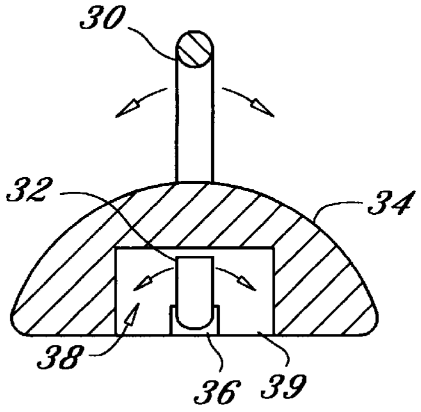
FIG. 15 is a cross-sectional view taken along line 15—15 of FIG. 14.

For example, referring to FIGS. 13, 14, and 15, retaining member 30 includes end members 32 that are elbow portions or simply bent continuations of member 30. Tack head 34 includes recessed areas 36 and 38, which are sized to receive retaining member 30 so that tack head 34 can rest relatively flush against tag body 2. Recessed areas 38 are substantially perpendicular to recessed areas 36, and extend deeper into tack head 34 than recessed areas 36 to accommodate end members 32. As in the preferred embodiment described above, when tack head 34 is in place adjacent tag body 2, there must be insufficient space between tack head 34 and tag body 2 for removal of retaining member 30 from underneath tack head 34, and for insertion of a prying tool.

In addition, an unauthorized person will not be able to laterally remove retaining member 30 from tack head 34 because blocking members 39 in recessed areas 38 will stop end members 32. The exterior walls 37 of recessed areas 38 can form blocking members 39.

When retaining member 30 is pulled laterally outward from tack head 34, interior surface 33 of end member 32 abuts against and is stopped by blocking member 39, thus preventing lateral removal of end members 32 from recessed areas 38. Blocking members 39 can be formed by other structures such as pins, bars or other structure that prevents removal of end members 32 (not shown), with walls 37 being the preferred embodiment for blocking member 39.

Retaining member 30 preferably can rotate 180 degrees in relation to tack head 34, with an axis of rotation perpendicular to elongated tack body 35, as illustrated by the arrows in FIG. 15. Tack body 35 preferably will be able to rotate, within the clutching mechanism in tag body 2, 360 degrees relative to tag 1, permitting tack head 34 and retaining member 30 to also rotate 360 degrees with an axis of rotation being collinear with elongated tack body 35.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A tack attachment mechanism for a theft deterrent tag, comprising:

a tack assembly having an elongated tack body and a tack head, said tack assembly adapted to be attachable to the tag, said tack head including a side adjacent said elongated tack body having a recessed area;

a retaining member removably attachable to said tack head, said retaining member including an end receivable within said recessed area;

said tack head side adjacent said elongated tack body disposable adjacent a portion of the tag when said tack assembly is attached to the tag; and, means for preventing removal of said retaining member end from said recessed area when said tack assembly is attached to the tag.

2. The tack attachment mechanism of claim 1 wherein said side adjacent said elongated tack body is disposable substantially flush against said portion of the tag when said tack assembly is attached to the tag.

3. The tack attachment mechanism of claim 1 wherein said means for preventing removal of said retaining member end from said recessed area includes a blocking member disposed within said recessed area and a first shoulder disposed on said retaining member end, said blocking member adapted to abut against said first shoulder to prevent removal of said retaining member end.

4. The tack attachment mechanism of claim 3 wherein said retaining member is rigid.

5. The tack attachment mechanism of claim 4 wherein said retaining member end includes an elbow portion, said first shoulder being formed by said elbow portion.

6. The tack attachment mechanism of claim 3 wherein said retaining member is semi-flexible.

7. The tack attachment mechanism of claim 6 wherein said retaining member includes a second end terminating in a loop.

8. The tack attachment mechanism of claim 3 wherein said retaining member end includes a substantially spherical shaped portion.

9. The tack attachment mechanism of claim 3 wherein said first shoulder is formed by a recessed portion of said retaining member.

10. The tack attachment mechanism of claim 1 wherein said tack head side adjacent said elongated tack body includes a first and a second recessed area, said retaining member includes a first and a second end receivable within said first and said second recessed area respectively.

11. The tack attachment mechanism of claim 10 wherein said retaining member is rigid.

12. The tack attachment mechanism of claim 10 wherein said retaining member is semi-flexible.

13. The tack attachment mechanism of claim 10 further including means for preventing removal of said first and said second retaining member ends from said first and said second recessed areas respectively when said tack assembly is attached to said tag.

14. The tack attachment mechanism of claim 13 wherein said means for preventing removal of said first and said second retaining member ends from said first and said second recessed areas includes a first blocking member and a second blocking member disposed within said first and said second recessed areas respectively, and a shoulder and a second shoulder disposed on said first and said second retaining member ends respectively, said first and said second blocking members adapted to abut against said first shoulder and said second shoulder, respectively, to prevent removal of said first and said second retaining member ends.

15. A tack attachment mechanism for a theft deterrent tag, comprising:

a tack assembly having an elongated tack body and a tack head, said tack head having a side adjacent said elongated tack body, said side including a recessed area, said tack assembly adapted to be attachable to the tag;

a retaining member removably attachable to said tack assembly on said tack head side adjacent said elongated tack body, said retaining member including an end receivable within said recessed area;

said tack head side adjacent said elongated tack body disposable substantially flush against a portion of the tag; and, means to prevent removal of said retaining member end from said recessed area when said tack assembly is attached to the tag.

16. A tack attachment mechanism for a theft deterrent tag, comprising:

a tack assembly having an elongated tack body and a tack head, said tack head having a first and a second recessed area on a side adjacent said elongated tack body, said first and said second recessed area including a first and a second blocking member, respectively, said tack assembly adapted to be attachable to the tag;

a retaining member removably attachable to said tack head side adjacent said elongated tack body, said retaining member including a first and a second end receivable within said first and said second recessed areas, respectively, said first and said second end including a first and a second shoulder, respectively, sized to engage said first and said second blocking members, respectively, preventing removal of said first and said second retaining member ends from said first and second recessed areas, respectively; and, said tack head side adjacent said elongated tack body disposable substantially flush against a portion of the tag when said tack assembly is attached to the tag.

* * * * *

UNITED STATES PATENT AND TRADEMARK OFFICE
CERTIFICATE OF CORRECTION

PATENT NO : 6,052,876
DATED : April 25, 2000
INVENTOR(S) : Hogan, et al

It is certified that error appears in the above-identified patent and that said Letters Patent is hereby corrected as shown below:

Column 9, line 29, before "shoulder", insert --first--.

Signed and Sealed this

Sixth Day of February, 2001

*Attest:*

Q. TODD DICKINSON

*Attesting Officer*

*Director of Patents and Trademarks*